United States Patent
Pope et al.

(10) Patent No.: US 9,045,347 B2
(45) Date of Patent: *Jun. 2, 2015

(54) STIOCHIOMETRIC SILICON CARBIDE FIBERS FROM THERMO-CHEMICALLY CURED POLYSILAZANES

(75) Inventors: Edward J. A. Pope, Oak Park, CA (US); Christopher L. Hill, Woodland Hills, CA (US); Carl N. Brabham, Thousand Oaks, CA (US); Jerry M. King, Granada Hills, CA (US); Bernard T. Morkunas, Thousand Oaks, CA (US)

(73) Assignee: General Electric Company, Schenectady, NY (US)

( * ) Notice: Subject to any disclaimer, the term of this patent is extended or adjusted under 35 U.S.C. 154(b) by 1109 days.

This patent is subject to a terminal disclaimer.

(21) Appl. No.: 13/037,151

(22) Filed: Feb. 28, 2011

(65) Prior Publication Data

US 2011/0212329 A1 Sep. 1, 2011

Related U.S. Application Data

(60) Provisional application No. 61/308,740, filed on Feb. 26, 2010.

(51) Int. Cl.
| | |
|---|---|
| *C01B 31/36* | (2006.01) |
| *C04B 35/626* | (2006.01) |
| *C08G 77/54* | (2006.01) |

(Continued)

(52) U.S. Cl.
CPC .............. *C01B 31/36* (2013.01); *C08G 79/08* (2013.01); *C04B 35/6229* (2013.01); *C01B 35/146* (2013.01); *C01B 21/068* (2013.01); *C01B 21/0643* (2013.01); *Y10T 428/2918* (2015.01); *C04B 35/62281* (2013.01); *C04B 35/62295* (2013.01); *C04B 35/6267* (2013.01); *C04B 35/6268* (2013.01); *C04B 35/6269* (2013.01); *C04B 2235/483* (2013.01); *C04B 2235/5252* (2013.01); *C04B 2235/5264* (2013.01); *C04B 2235/72* (2013.01); *C04B 2235/722* (2013.01); *C04B 2235/723* (2013.01); *C04B 2235/96* (2013.01); *C08G 77/54* (2013.01); *C08G 77/62* (2013.01); *D01F 9/10* (2013.01)

(58) Field of Classification Search
CPC .... C08G 77/62; C08G 79/08; C04B 35/6229; C04B 35/62295; C04B 35/62281; C01B 21/068; C01B 21/0643; C01B 35/146; C01B 31/36; C01F 9/10

See application file for complete search history.

(56) References Cited

U.S. PATENT DOCUMENTS

| | | | |
|---|---|---|---|
| 4,298,558 A | 11/1981 | Baney et al. | |
| 4,298,559 A | 11/1981 | Baney et al. | |
| 4,340,619 A | 7/1982 | Gaul, Jr. | |
| 4,404,153 A * | 9/1983 | Gaul, Jr. | 264/29.2 |

(Continued)

*Primary Examiner* — Margaret Moore
(74) *Attorney, Agent, or Firm* — General Electric Company; Brian P. Overbeck (57) ABSTRACT

A novel polycrystalline stoichiometric fine SiC fiber substantially free of impurities is produced using a novel pre-ceramic polymer. The pre-ceramic polymer is prepared by reacting a mixture of chlorodisilane, boron trichloride, and a vinyl chlorodisilane with an excess of hexamethyldisilazane to form the pre-ceramic polymer resin, which may then be melt-spun, cured, pyrolyzed and heat-treated to obtain the finished SiC fiber. The manufacturing process for the production of the fine SiC ceramic fiber allows for flexibility with respect to cross-linking, in that low-cost thermal treatments may replace more complex methods, while obtaining fibers with improved materials properties as compared to currently available SiC fibers.

19 Claims, 3 Drawing Sheets

(51) Int. Cl.
  *D01F 9/10* (2006.01)
  *C08G 79/08* (2006.01)
  *C04B 35/622* (2006.01)
  *C01B 35/14* (2006.01)
  *C01B 21/068* (2006.01)
  *C01B 21/064* (2006.01)
  *C08G 77/62* (2006.01)

(56) References Cited

U.S. PATENT DOCUMENTS

| | | |
|---|---|---|
| 4,540,803 A | 9/1985 | Cannady |
| 4,828,663 A | 5/1989 | Reedy, Jr. et al. |
| 5,268,336 A | 12/1993 | Deleeuw et al. |
| 5,292,830 A * | 3/1994 | Funayama et al. ............ 525/478 |

* cited by examiner

STIOCHIOMETRIC SILICON CARBIDE FIBERS FROM THERMO-CHEMICALLY CURED POLYSILAZANES

CROSS-REFERENCE TO RELATED APPLICATIONS

This application claims priority pursuant to 35 U.S.C. §119(e) to U.S. provisional application Ser. No. 61/308,740, filed Feb. 26, 2010, which is hereby incorporated by reference in its entirety.

STATEMENT OF GOVERNMENT INTEREST

This invention was made with government support under contract number FA9300-08-C-2003 awarded by the United States Air Force at AFRL. The U.S. Government has certain rights in the invention.

BACKGROUND

1. Field

The present disclosure relates to stoichiometric silicon carbide (SiC) fibers, and methods of making SiC fibers.

2. Description of Related Art

Various processes are known for producing fine SiC fibers, but known processes are subject to certain disadvantages. For example, known processes are limited to producing a SiC ceramic fiber that contains at least one of the impurities boron, oxygen, nitrogen or metal impurities such as aluminum, zirconium or titanium. For further example, known processes produce fibers with undesirably high variability in physical properties, or entail an undesirably high manufacturing cost or complexity. It would be desirable to provide an SiC fiber and process for manufacturing that overcomes these and other disadvantages of the prior art.

SUMMARY

The present disclosure describes a novel chemical formulation to generate a pre-ceramic polymer, and processes for manufacture of stoichiometric silicon carbide ceramic fiber from said polymer. A new chemistry is used to achieve a thermoplastic processable pre-ceramic polymer, with controlled rheological properties, that undergoes conversion to a thermo-set or non-meltable solid by simple heating. The thermoplastic processable pre-ceramic polymer has the potential to greatly reduce manufacturing complexity of high temperature fine SiC fibers by eliminating the necessity for electron beam irradiation facilities which are one route used to process commercial fibers today. In addition, the manufacturing process disclosed may reduce materials properties variability as found in all commercial fiber systems today, by removing the need for chemical or oxidative treatments during processing using the unique pre-ceramic polymer blend described herein.

The precursors (raw materials) for synthesizing the present preceramic polymer to produce stoichiometric SiC ceramic fibers comprise a mixture of chlorodisilanes. Additional critical precursors are added to control the melting point of the thermoplastic pre-ceramic polymer and also control spinning properties, including melt strength and stability during extrusion and winding of the fiber. The resultant pre-ceramic polymer exhibits excellent spinning, fiber quality, and uniformity of the "green" fiber. The increased chemical functionality also incorporates a well defined, latent reactivity within the novel pre-ceramic polymer, which facilitates the conversion to a handleable green fiber by low temperature heating (less than 300° C.), without additional treatments such as chemical or electron beam irradiation curing.

There are significant advantages to the disclosed route over chemical curing, where the surface chemistry is altered by directing reactive, corrosive, or oxidative species at an extruding pre-ceramic polymer fiber. The "green" fiber chemistry is controlled during polymerization, for the novel process disclosed herein, and not by additional gas phase interactions described in the chemical curing process. Thermal curing for the novel pre-ceramic polymer also negates the use of electron beam irradiation to render the polymer useful for ceramic fiber production at a major reduction in cost.

Practicing a method as disclosed herein results in a polycrystalline, stoichiometric SiC fiber that is substantially free of any impurity, in that the SiC fiber does not include detectable amounts of any material except for carbon and silicon, which are present in a stoichiometric or near-stoichiometric ratio. The fiber may retain a slight excess of carbon to improve sintering properties. The resulting SiC fiber is substantially free of any impurity such as, for example, boron, oxygen, or nitrogen, which are removed during processing. The SiC fiber is also free of any metal impurity such as, for example, aluminum, zirconium, or titanium, because no metals or metal compounds are added during processing. The SiC fiber does not include detectable amounts of any material except for carbon and silicon. The SiC fiber may have a diameter less than about 10 μm and a tensile strength greater than about 1.5 GPa.

A more complete understanding of the SiC fiber and method of manufacturing the fiber will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF VARIOUS EMBODIMENTS

Figure 1:
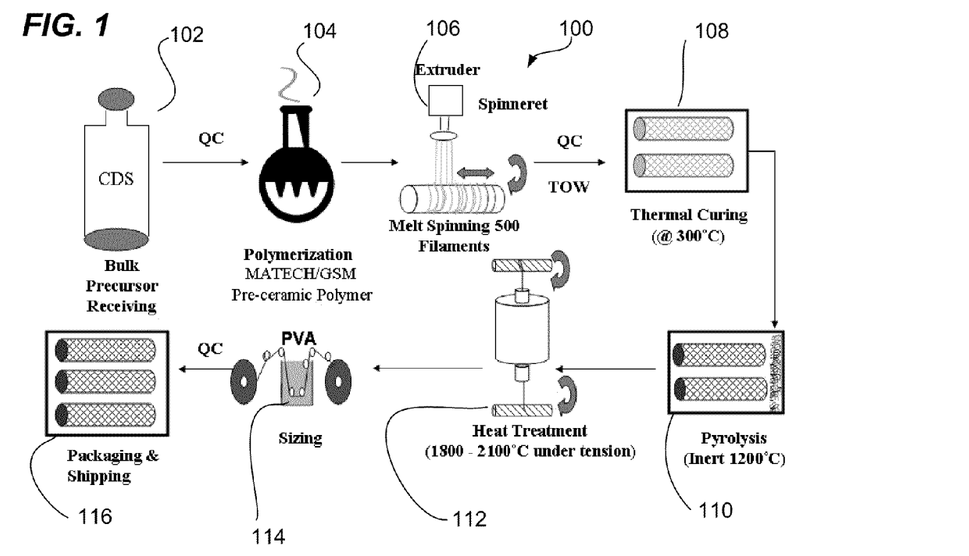
FIG. 1 is a schematic diagram illustrating a method for manufacturing stoichiometric SiC fiber using the novel pre-ceramic polymer disclosed herein.

FIG. 1 shows a method 100 for manufacturing stoichiometric SiC fiber using the novel pre-ceramic polymer disclosed herein. Details concerning the pre-ceramic polymer and component mixtures are described herein below. An initial primary input 102 comprises a chlorodisilane (CDS) component. The CDS is mixed with secondary components as described herein below to form a mixture, and at 104, the mixture is polymerized. The polymerized mixture is then transferred to the extrusion line with as little exposure to ambient air as possible. Quality control of the polymer (QC) is carried out by measuring the viscosity (Viscometry) and molecular weight distribution by Gel Permeation Chromatography (GPC). Specific chemical reactions as described herein below are utilized in the polymerizing step and the efficacy of those modifications is determined by the above QC techniques.

The final pre-ceramic polymer is transferred as a solid to the spin line and at 106, extruded through a spinneret at a temperature between 100-180° C. and wound onto mandrels. In a prototype process, spinnerets for producing 300-500 filaments were used. Diameter of the melt-spun fiber may be controlled with the winding system to achieve diameters between 15-20 micrometers (μm). The spooled tow of "green" fiber may be packaged under tension in an inert atmosphere and transferred to a thermal curing/pyrolysis furnace, where at 108 the green fiber is first low-temperature cured at a temperature between 100° C. and 300° C., for example at 180° C. for three hours. After low-temperature thermal curing, the spun fiber should be sufficiently cross-linked to maintain its shape when heated above about 300° C. If cross-linking is not completed, subsequent pyrolysis will destroy the fiber. Use of a polymer formulation as disclosed herein should obviate the need for further cross-linking steps such as, for example, chemical curing or electron beam irradiation. While an alternative cross-linking operation may be used if desired, exclusive use of low-temperature thermal curing has been shown to produce a final SiC fiber with superior properties.

After cross-linking at 108, the fibers are rendered infusible and pyrolyzed to a silicon carbonitride (SiNC) glass by heating up to 1200° C. in inert conditions, at 110. SiNC tow is removed from the furnace after pyrolysis and at 112 fed into a heat treatment furnace under tension at 1800-2100° C., for example at 2050° C., to remove nitrogen, excess oxygen, and densify the filaments to a near stoichiometric ratio (1:1) of SiC and polycrystalline form. A slight excess of carbon may be retained as a sintering aid to improve the mechanical properties.

Figure 2:
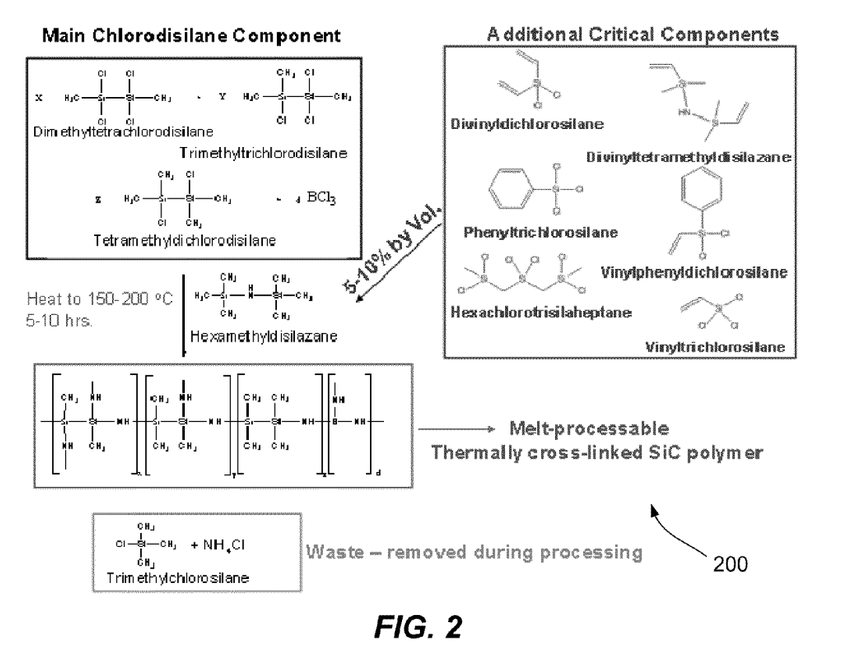
FIG. 2 shows chemical structures of components used to form the novel pre-ceramic polymer.

FIG. 2 outlines the novel formulation 200 of the mixture used in the polymerization step 104 represented in FIG. 1. A chlorodisilane mixture is polymerized to polydisilazane (novel pre-ceramic polymer) by using hexamethyldisilazane as the linking source through nitrogen incorporation. The CDS, 1-5 mol % boron-tri-halide (chloride or bromide), and 5-10%, by volume, of chlorosilane monomers ("Critical Components") are directly responsible for the thermal cross-linking capacity of the pre-ceramic polymer and final molecular weight are added to the chlorodisilane mixture. This chlorodisilane/silane mixture is then added to the HMDS slowly to control an initial exothermic phase of the polymerization. The reaction may be conducted in a continuous stirred tank reactor from 1-5 L volume size, and heated up to a range between 150-200° C. for up to 10 hours. In this manner, boron, excess carbon, and thermally reactive groups become part of the polymer backbone, and are thereby homogenously distributed in the SiNC ceramic after pyrolysis.

Figure 3:
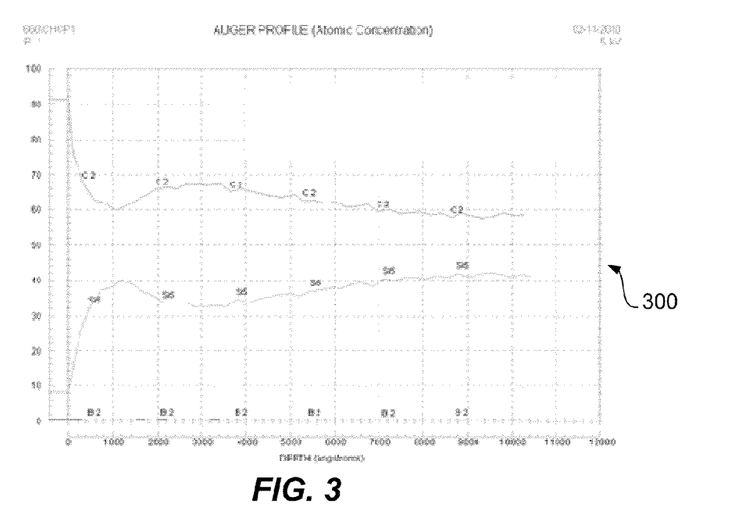
FIG. 3 is an auger electron spectroscopy depth profile of a finished SiC ceramic fiber formed using a method disclosed herein.

Boron and additional chlorosilane monomer doping levels have been fully characterized and upper limits determined. To quantify boron and other impurities in heat treated fiber, Auger Electron Spectroscopy (AES) was utilized to confirm boron, oxygen, and nitrogen concentrations in a finished heat-treated SiC fiber. FIG. 3 is a depth profile 300 from the surface to defined depth by removing material through the use of an argon ion beam. The detection limit for the AES was 0.3 atomic percent. Boron, nitrogen and oxygen were not detected. Except for an excess of carbon in approximately 500 angstrom surface layer, carbon/nitrogen ratios were stoichiometric or near stoichiometric through the entire sample. For the depicted depth profile, the SiC ratio was not calibrated to stoichiometric SiC.

As shown in FIG. 3, all three known impurities were observed to be below the detection limits of the Auger technique. No commercial SiC fiber exhibits impurities below detection limits; i.e., all exhibit impurities greater than 0.3 atomic percent. Prior to heat treatment, nitrogen content is approximately 40 atomic percent. All commercial fibers exhibit some detectable amount of oxygen or boron. The novel pre-ceramic chemistry and heat treatment described above has facilitated the removal of these deleterious species with respect to high temperature mechanical properties. In addition, the fiber is free of any metal, for example, aluminum, zirconium, or titanium, unlike certain commercially available SiC ceramic fibers, and no metals are added during processing.

Figure 4:
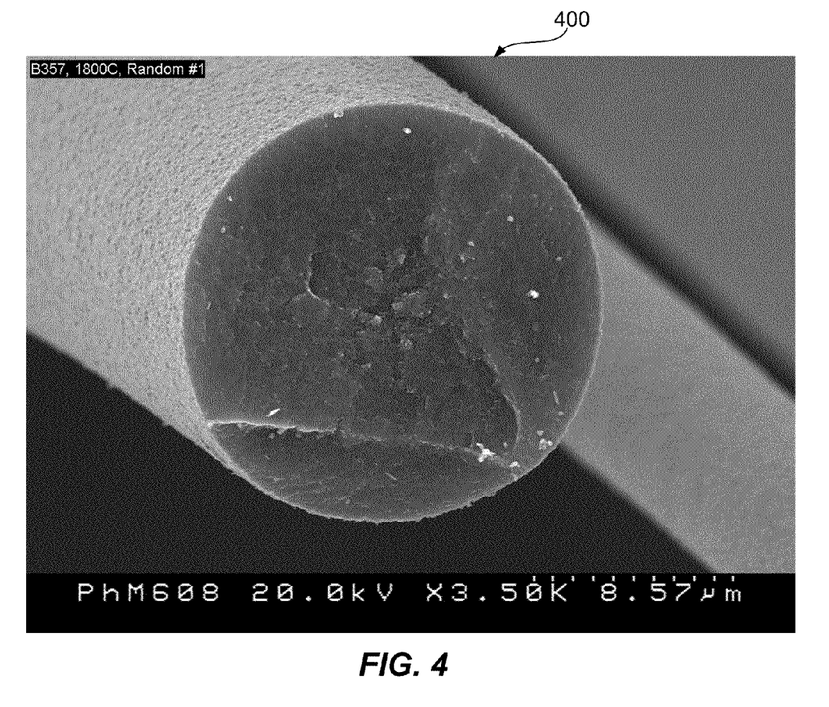
FIG. 4 is a Scanning Electron Microscopy (SEM) micrograph of a highly sintered SiC fiber formed using a method disclosed herein.

FIG. 4 is a Scanning Electron Microscopy (SEM) micrograph 400 of a highly sintered SiC fiber developed with the described procedure. Filament diameters were measured between 8-10 μm with tensile strengths of 1.73 GPa ($1\times10^9$ Pascal's $N/M^2$).

Figure 5:
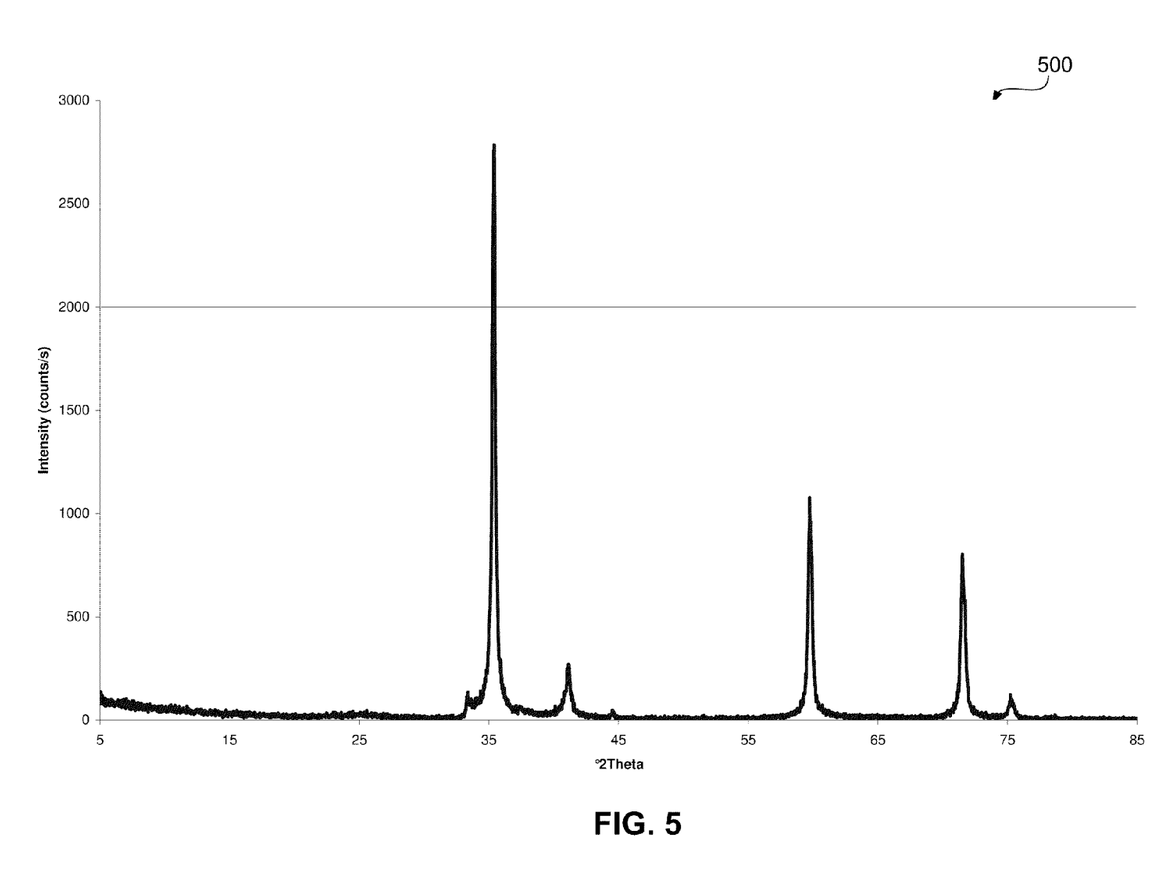
FIG. 5 is a X-Ray Diffraction (XRD) pattern for the heat-treated SiC fiber formed using a method disclosed herein.

FIG. 5 is an XRD pattern 500 for the heat treated SiC fiber. The highly crystalline SiC fiber was analyzed by X-Ray Diffraction (XRD) and determined to be predominately β-SiC (cubic) with a small amount α-SiC. Grain size appears to approximately 100 nanometers.

Examples of SiC Fiber Manufacturing:

A list of chemicals that may be utilized in the processing of heat treated SiC ceramic fiber from polymer precursors is provided below. The three main components are:
1. Hexamethyldisilazane (HMDS)
2. Chlorodisilane (CDS) (Source: Dow Corning)
3. Boron Trichloride (BCl3)

Secondary critical components utilized in this process are added in low volumes less than 10% and molar ratios (<5%) to the CDS. The secondary components are used to control the polymer rheology and to enable cross-linking by low-temperature thermal processing. Secondary components are selected from:
a) vinylphenyldichlorosilane
b) 1,1,3,3,-tetrachloro-1,3disilabutane
c) vinyltrichlorosilane
d) 1,1,3,3,tetraphenyldisilazane
e) diphenyldichlorosilane
f) 1-3 divinyltetramethyldisilazane
g) 2,2,4,4,6,6-Hexachloro-2,4,6-trisilaheptane
h) divinyldichlorosilane
i) phenyltrichlorosilane
j) dichloromethylvinylsilane
k) silicon tetrachloride The following examples refer to the reference letters provided in the list above.

Example 1

Polymer Synthesis

1. Base polymer:
200 g. Dow Corning CDS and
100 g. BCl3
2. Vinyl Addition (thermal cross-linking)
15 g. dichloromethylvinylsilane
3. Chemistry/Rheology modifier
35 g. phenyltrichlorosilane
1,2,3 are added to a single pressure equalizing addition funnel and mixed well. The mixture of 1,2,3 is then added to 400 grams of HMDS in a continuously stirred tank reactor with exhaust ports to drive of low boiling waste products. The tank is heated to 180° C. over 5 hours and treated at 180° C. for an additional 3 hours. The solid resin is then melt-spun at 150° C., under inert conditions, and then prepared for cross-linking and pyrolysis/heat treatment.

Example 2

Polymer Synthesis

1. Base polymer:
200 g. Dow Corning CDS
100 g. BCl3
2. Vinyl Addition (thermal cross-linking)
15 g. dichloromethylvinylsilane
3. Chemistry/Rheology modifier
24 g. phenyltrichlorosilane
10 g. 2,2,4,4,6,6-hexachloro-2,4,6-trisilaheptane 1,2,3 are added to a single pressure equalizing addition funnel and mixed well. The mixture of 1,2,3 is then added to 464 grams of HMDS in a continuously stirred tank reactor with exhaust ports to drive of low boiling waste products. The tank is heated to 180° C. over 5 hours and treated at 180° C. for an additional 3 hours. The solid resin is then melt-spun at 150° C., under inert conditions, and then prepared for cross-linking and pyrolysis/heat treatment.

Example 3

Polymer Synthesis

1. Base polymer:
200 g. Dow Corning CDS
100 g. BCl3
150 g. 1-3 divinyltetramethyldisilazane (additional cross-linking)
2. Vinyl Addition (thermal cross-linking)
15 g. dichloromethylvinylsilane
3. Chemistry/Rheology modifier
34 g. phenyltrichlorosilane
10 g. 2,2,4,4,6,6-Hexachloro-2,4,6-trisilaheptane 1,2,3 are added to a single pressure equalizing addition funnel and mixed well. The mixture of 1,2,3 is then added to 200 grams of HMDS in a continuously stirred tank reactor with exhaust ports to drive of low boiling waste products. The tank is heated to 180° C. over 5 hours and treated at 180° C. for an additional 3 hours. The solid resin is then melt-spun at 150° C., under inert conditions, and then prepared for cross-linking and pyrolysis/heat treatment.

Example 4

Polymer Synthesis

1. Base polymer:
200 g. Dow Corning CDS
100 g. BCl3
2. Vinyl Addition (thermal cross-linking)
15 g. vinylphenyldichlorosilane
3. Chemistry/Rheology modifier
34 g. phenyltrichlorosilane 1,2,3 are added to a single pressure equalizing addition funnel and mixed well. The mixture of 1,2,3 is then added to 400 grams of HMDS in a continuously stirred tank reactor with exhaust ports to drive of low boiling waste products. The tank is heated to 180° C. over 5 hours and treated at 180° C. for an additional 3 hours. The solid resin is then melt-spun at 150° C., under inert conditions, and then prepared for cross-linking and pyrolysis/heat treatment.

Generalized Example

Polymer Synthesis

1. Base polymer:
200 g. Dow Corning CDS
100 g. BCl3
100-200 g. of compounds d or f (optional)
2. Vinyl Addition (thermal cross-linking)
5-35 g. vinylphenyldichlorosilane or a,h,j
3. Chemistry/Rheology modifier
20-50 g. phenyltrichlorosilane or b,c,g,i,k 1,2,3 are added to a single pressure equalizing addition funnel and mixed well. The mixture of 1,2,3 is then added to 400 grams of HMDS in a continuously stirred tank reactor with exhaust ports to drive of low boiling waste products. The tank is heated to 180° C. over 5 hours and treated at 180° C. for an additional 3 hours. The solid resin is then melt-spun at 150° C., under inert conditions, and then prepared for cross-linking and pyrolysis/heat treatment.

Cross-Linking of SiC Precursor Fibers:

Cross-linking as shown at 108 of FIG. 1 is a very crucial first step of forming strong ceramic fiber. Fibers under slight tensioning remain straight during cross-linking. Fibers are free to move tend to curve and are fixed into a curved shape by cross-linking. Curved ceramic fibers break early, at low load later on when fiber strength is tested. Therefore, it may be preferable (but is not required) to perform cross-linking with fibers lightly tensioned, whether wound on mandrels or supported in some other fashion. All cross-linked fibers may be pyrolyzed in tube furnaces with programmable temperature control, as was done for the examples discussed herein. The novel pre-ceramic polymer disclosed herein may also be cross-linked by a variety of other methods outlined in the following section. All fibers, taken from synthesis examples 1-5, should cross-link under the disclosed methods.

1. Cross-linking Methods
    (a) Thermal curing in inert conditions (e.g., under inert flowing $N_2$), for example using a temperature profile of 1° C./min from room temperature to 300° C. (low-temperature phase) Pyrolysis may follow the thermal curing as part of a continuous sequence.
    (b) E-beam curing: Dosage as low as 60,000 Grays
    (c) Chemical cross-linking with NH3 or methyltrichlorosilane, for example:
        (i) 1° C./min to 100° C. hold for 30 mins.
        (ii) Start $NH_3$ flow and hold for 30 more mins., then increase temp. to 200° C. by 1° C./min.
        (iii) At 200° C., change to N2 flow and increase temp to 350° C. by 5° C./min hold there for 1 hr than increase temp to 1200° C. by 5° C./min.
    (d) Plasma curing with atmospheric Ar+ plasma generator.
    (e) Presence of Decaborane vapor during heating up to 200° C. (isothermal).
2. Pyrolysis and Heat Treatments
    (a) After fiber well is cross-linked, the pre-ceramic fiber may be pyrolyzed using a higher temperature excursion under inert conditions, for example, 5° C./min to 1200° C., then holding hold 1 hr at 1200° C., starting from room temperature or from 300° C. if low temperature thermal curing (1a) is used. The cross-linked fiber may be exposed to a mixture of a noble gas and hydrogen during pyrolysis.

(b) Pyrolyzed SiNC Fibers are placed under tension and fired again under inert conditions, for example, from room temperature 5° C./min up to 1200° C. up, followed by firing to 2050° C. at 20-50° C./min and holding 0.1 hr at 2050° C. before gradually cooling to room temperature.

In summary of the foregoing examples and general disclosure, one or more methods for preparing a pre-ceramic polymer and SiC ceramic fiber from said polymer may be practiced, as follows.

A mixture of chlorodisilane (CDS), boron trichloride, and a vinyl chlorodisilane may be reacted with an excess of hexamethyldisilazane (HMDS) to form a pre-ceramic polymer resin. The components of the mixture may be selected such that the mixture comprises a compound selected from the group consisting of 1,1,3,3, tetraphenyldisilazane and 1,3 divinyltetramethyldisilazane, in the range of 5 to 35 percent by weight (wt %); more preferably 15 to 25 wt %, and still more preferably about 20 wt %. The amount of the CDS in the mixture may be controlled so that the CDS comprises a component of the mixture in the range of 30 to 60 wt %, more preferably 50 to 60 wt %, and still more preferably about 55 wt %. The amount of boron trichloride may be controlled so that it comprises a component of the mixture in the range of 2 to 10 molar percent (mol %) added based on molarity of solution to which it is added, and more preferably about 2 mol %.

The vinyl chlorodisilane component of the mixture may be selected from the group consisting of: vinylphenyldichlorosilane, divinyldichlorosilane, and dichloromethylvinylsilane; including a mixture of two or more of these species. The vinyl chlorodisilane component may be controlled so that it comprises a component of the mixture in the range of 0.5 to 10 wt %, more preferably 1 to 3 wt %, and still more preferably about 2 wt %.

A rheology modifier may be added to the mixture in an amount within the range of 1 to 15 wt %, more preferably 2 to 5 wt %, and still more preferably about 3 wt %. The rheology modifier may be selected from the group consisting of: 1,1,3,3-tetrachloro-1,3-disilabutane, vinyltrichlorosilane, 2,2,4,4,6,6-hexachloro-2,4,6-trisilaheptane, trichlorosilane, and silicone tetrachloride; including a mixture of two or more of these species. Preferably, the rheology modifier comprises silane additives and is added to the mixture in an amount effective for obtaining a melt-spinning temperature of the pre-ceramic polymer resin in a range of about 100 to 180° C.

A pre-ceramic polymer resin as thus obtained may be melt-spun to obtain a pre-ceramic fiber. The resulting pre-ceramic fiber may be cross-linked using any suitable method to obtain a cross-linked fiber. Cross-linking the pre-ceramic fiber may be performed under tension to obtain a straight cross-linked fiber. Preferably, cross-linking the preceramic fiber is performed by thermal curing at least partly at temperatures not greater than 300° C., without chemical or electron beam irradiation curing. In the alternative, or in addition, cross-linking the preceramic fiber may be performed by at least one of the following: thermal curing at less than 1200° C. in an inert atmosphere, e-beam curing, chemical cross-linking, plasma curing, or exposure to decaborane vapor.

The resulting cross-linked fiber may be pyrolyzed at temperatures up to about 1400° C. to obtain a near stoichiometric SiC ceramic fiber having a microcrystalline structure. It has been found advantageous to expose the cross-linked fiber to a mixture of a noble gas and hydrogen during the pyrolyzing step.

After pyrolyzing, it is advantageous to heat-treat the near stoichiometric SiC ceramic fiber in the range of 1400° C. to 2200° C. to obtain a heat-treated stoichiometric SiC ceramic fiber substantially free of boron, nitrogen, and oxygen. The resulting polycrystalline stoichiometric SiC ceramic fiber is substantially free of impurities. For example, the fiber is free of detectable boron, oxygen, or nitrogen to a detection limit not greater than 0.3 atomic percent. In some embodiments, the fiber has a diameter in the range of about 8-10 µm, although fibers outside of this range are also within the scope of the present technology. Advantageously, the fiber has a tensile strength not less than about 1.5 GPa, and has been measured to exceed about 1.7 GPa, although other tensile strengths may also result from a method within the scope of what is disclosed herein.

Having thus described embodiments of a method for forming a pre-ceramic polymer resin, a method for forming a stoichiometric SiC fiber from said pre-ceramic polymer, and a polycrystalline stoichiometric SiC ceramic fiber substantially free of impurities formed by the method, it should be apparent to those skilled in the art that certain advantages of the described methods have been achieved. It should also be appreciated that various modifications, adaptations, and alternative embodiments thereof may be made within the scope and spirit of the present invention. The invention is defined by the following claims.

What is claimed is:

1. A method comprising:
reacting a mixture of chlorodisilane (CDS), boron trichloride, and a vinyl chlorodisilane with hexamethyldisilazane (HMDS) to form a pre-ceramic polymer resin.

2. The method of claim 1, wherein the mixture further comprises a compound selected from the group consisting of 1,1,3,3, tetraphenyldisilazane and 1,3 divinyltetramethyldisilazane, in the range of 5 to 35 percent by weight.

3. The method of claim 2, wherein the CDS comprises a component of the mixture in the range of 30 to 60 percent by weight.

4. The method of claim 2, wherein the boron trichloride comprises a component of the mixture in the range of 2 to 10 molar percent.

5. The method of claim 1, wherein the vinyl chlorodisilane comprises a component of the mixture in the range of 0.5 to 10 percent by weight.

6. The method of claim 1, wherein the mixture further comprises a rheology modifier in the range of 1 to 15 percent by weight.

7. The method of claim 6, wherein the rheology modifier is selected from the group consisting of: 1,1,3,3-tetrachloro-1,3-disilabutane, vinyltrichlorosilane, 2,2,4,4,6,6-hexachloro-2,4,6-trisilaheptane, trichlorosilane, and silicon tetrachloride.

8. The method of claim 6, further comprising adding the rheology modifier in an amount effective for obtaining a melt-spinning temperature of the pre-ceramic polymer resin in a range of about 100 to 180° C.

9. The method of claim 1, further comprising melt-spinning the pre-ceramic polymer resin to obtain a pre-ceramic fiber.

10. The method of claim 9, further comprising cross-linking the pre-ceramic fiber to obtain a cross-linked fiber.

11. The method of claim 10, wherein cross-linking the pre-ceramic fiber is performed under tension to obtain a straight cross-linked fiber.

12. The method of claim 10, wherein cross-linking the preceramic fiber is performed by thermal curing at least partly at temperatures less than 300° C., without chemical or electron beam irradiation curing.

13. The method of claim 10, wherein cross-linking the preceramic fiber is performed by at least one of the following: thermal curing at less than 1200° C. in an inert atmosphere, e-beam curing, chemical cross-linking, plasma curing, or exposure to decaborane vapor.

14. The method of claim 10, further comprising pyrolyzing the cross-linked fiber up to about 1400° C. to obtain a near stoichiometric SiC ceramic fiber having a microcrystalline structure.

15. The method of claim 14, further comprising exposing the cross-linked fiber to a mixture of a noble gas and hydrogen during the pyrolyzing step.

16. The method of claim 14, further comprising heat-treating the near stoichiometric SiC ceramic fiber in the range of 1400° C. to 2200° C. to obtain a heat-treated stoichiometric SiC ceramic fiber substantially free of boron, nitrogen, and oxygen.

17. A method comprising:
    reacting a mixture of chlorodisilane (CDS), boron trichloride, vinyl chlorodisilane and vinylphenyldichlorosilane with hexamethyldisilazane (HMDS) to form a pre-ceramic polymer resin.

18. A method comprising:
    reacting a mixture of chlorodisilane (CDS), boron trichloride, vinyl chlorodisilane and divinyldichlorosilane with hexamethyldisilazane (HMDS) to form a pre-ceramic polymer resin.

19. A method comprising:
    reacting a mixture of chlorodisilane (CDS), boron trichloride, vinyl chlorodisilane and dichloromethylvinylsilane with hexamethyldisilazane (HMDS) to form a pre-ceramic polymer resin.

* * * * *

UNITED STATES PATENT AND TRADEMARK OFFICE
CERTIFICATE OF CORRECTION

| | | |
|---|---|---|
| PATENT NO. | : 9,045,347 B2 | Page 1 of 1 |
| APPLICATION NO. | : 13/037151 | |
| DATED | : June 2, 2015 | |
| INVENTOR(S) | : Pope et al. | |

It is certified that error appears in the above-identified patent and that said Letters Patent is hereby corrected as shown below:

On the Title Page, in Item (54), and in the Specification, Column 1, Line 1, in the Title, delete "STIOCHIOMETRIC" and insert -- STOICHIOMETRIC --, therefor.

In the claims,

In Column 9, Lines 19-20, in Claim 17, delete "trichloride, vinyl chlorodisilane" and insert -- trichloride, --, therefor.

In Column 9, Lines 24-25, in Claim 18, delete "trichloride, vinyl chlorodisilane" and insert -- trichloride, --, therefor.

In Column 9, Lines 29-30, in Claim 19, delete "trichloride, vinyl chlorodisilane" and insert -- trichloride, --, therefor.

Signed and Sealed this
Twenty-ninth Day of March, 2016

Michelle K. Lee
*Director of the United States Patent and Trademark Office*